United States Patent [19]

Scannell et al.

[11] Patent Number: 5,377,354
[45] Date of Patent: Dec. 27, 1994

[54] METHOD AND SYSTEM FOR SORTING AND PRIORITIZING ELECTRONIC MAIL MESSAGES

[75] Inventors: Niamh C. Scannell, Mountain View, Calif.; Stuart D. Dawson, Reading, England; Anthony J. Redmond, Dublin, Ireland; Serge Himbaut, Antibes; Pascale Bares, Villeneuve Loubet, both of France; Alison Clark, Morpeth, England

[73] Assignee: Digital Equipment Corporation, Maynard, Mass.

[21] Appl. No.: 74,697

[22] Filed: Jun. 8, 1993

Related U.S. Application Data

[63] Continuation of Ser. No. 566,727, Aug. 13, 1990, abandoned.

[30] Foreign Application Priority Data

Aug. 15, 1989 [GB] United Kingdom .................. 8918553

[51] Int. Cl.⁵ ............................................. G06F 15/20
[52] U.S. Cl. ........................................ 395/650; 395/54; 395/600; 395/700; 364/274.5; 364/281.3; 364/401
[58] Field of Search .................. 395/54, 600, 650, 700; 364/401, 513

[56] References Cited

U.S. PATENT DOCUMENTS

| | | | |
|---|---|---|---|
| 4,503,499 | 3/1985 | Mason et al. | 364/200 |
| 4,713,780 | 12/1987 | Shultz et al. | 364/514 |
| 4,745,559 | 5/1988 | Willis et al. | 364/514 |
| 4,745,595 | 5/1988 | Muir et al. | 370/85 |
| 4,750,135 | 6/1988 | Boilen | 364/514 |
| 4,961,152 | 10/1990 | Davis | 364/513 |
| 4,962,532 | 10/1990 | Kasiraj et al. | 380/25 |
| 5,051,891 | 9/1991 | MacPhail | 364/200 |
| 5,063,523 | 11/1991 | Vrenjak | 364/514 |
| 5,065,347 | 11/1991 | Pajak et al. | 395/159 |
| 5,093,918 | 3/1992 | Heyen et al. | 395/725 |
| 5,167,011 | 11/1992 | Priest | 395/54 |
| 5,182,162 | 1/1993 | Smith et al. | 364/419 |
| 5,182,705 | 1/1993 | Barr et al. | 364/401 |
| 5,210,869 | 5/1993 | Williams | 395/600 |

OTHER PUBLICATIONS

David H. Crocker, Standard for the Format of ARPA Internet Text Messages, Aug. 13, 1982, pp. i–47.
Chang et al., A Knowledge-Based Message Management System, ACM Trans. on Office Information Systems, vol. 5, No. 3, Jul. 1987, pp. 213–236.
A knowledge-Based Message Management System by Shi-Kuo Chang and L. Leung, in Association for Computing Machinery Transactions, vol. 6, No. 3, Jul. 1987, pp. 213–236.
CCITT Recommendation X.413, Fascicle VII. 7, 14 Nov. 1988, Melbourne, AU, pp. 426–503, "Message Handling Systems: Message Store: Abstract Service Definition".
R. N. Cronk et al., "Rule Based Expert Systems for Network Management and Operations: An Introduction", IEEE Network: The Magazine of Computer Communications, vol. 2, No. 5, Sep. 1988, New York, US, pp. 7–21.

*Primary Examiner*—Gareth D. Shaw
*Assistant Examiner*—Dennis M. Butler
*Attorney, Agent, or Firm*—Rama B. Nath; Ronald C. Hudgens; Albert P. Cefalo

[57] ABSTRACT

A method and apparatus for prioritizing a plurality of incoming electronic mail messages for a user uses a user created and modified rules-control (12) which is stored in a rules-store (12). Incoming messages are stored in a message store (11) and are screened individually by a rules test unit (13). The rules-test unit has a comparator (52) which matches keywords which are chosen by the user while creating the rules, add supplies signals to an action list unit (54). By applying the user created rules for deciding which messages constitute the priority messages for the user, a priority assigning unit (45) within an action portion (35B) of the rules-store (12) assigns a priority number (say from 1 to 5, 1 being the highest priority for example) to each screened message. Responsive to the assigned priority number of the screened message, the message is sent to a main folder store or forwarded or put away as appropriate. The user created rules can be modified by the user using a conventional keyboard.

16 Claims, 2 Drawing Sheets

METHOD AND SYSTEM FOR SORTING AND PRIORITIZING ELECTRONIC MAIL MESSAGES

This application is a continuation of application Ser. No. 07/566,727, filed Aug. 13, 1990 now abandoned.

BACKGROUND OF THE INVENTION

1. Field of the Invention

The present invention relates generally to message control systems, and more particularly to improvements in electronic mail control systems.

Digital communication systems of the "electronic message" or "electronic mail" type are well established. In such systems, several, (often a very large number) of work stations are interconnected by a system which allows users at the work stations to send messages to each other. Such messages are the electronic equivalent of letters and memoranda.

2. Description of the Prior Art

Available prior art addresses the issue of handling mail messages in general. For example, U.S. Pat. No. 4,745,559 to Willis et al teaches a manner of incrementally increasing or decreasing the content of a local data base; the required communications capacity of the system is reduced by using set identifiers. The system is an information retrieval communication network which is not described as being suitable to handle electronic mail.

U.S. Pat. No. 4,750,135 to Boilen teaches a method of using filter sets or local templates on a stream of data records to obtain user-created reconstituted data records. There is no description therein suggesting that the method is suitable for handling electronic mail.

U.S. Pat. No. 4,713,780 teaches a manner of electronically delivering a document, but no mail sorting mechanism nor method is taught therein.

U.S. Pat. No. 4,745,595 to Muir et al. teaches an electronic mailbox system wherein a plurality of similar data terminals are tied to a telephone line. Any selected one of the data terminals can be made the controlling terminal. However, this prior art system does not teach any filter for the electronic mail messages.

A paper by Chang & Leung, entitled A Knowledge-Based Message Management System, published in Vol. 6, No. 3, July 87 edition of Association for Computing Machinery Transactions discloses a linguistic message filter which can be applied to incoming messages. The filter determines whether to transmit the full text of a screened message or a short alert message, or to store the message for later transmission or processing. There is no mention in the Chang and Leung paper regarding assigning a priority number to incoming messages and presenting the messages without altering them, certainly not in an order and sequence determined by the assigned priority number as in the present invention.

In a typical system which the present invention relates to, there will normally be a standard format defined for such messages (or, often, a number of slightly different formats for different purposes). The format will normally have several fields, including a sender field, a date field, an addressee field, and a message body field; in addition, there will often be further fields, including in particular a "copy-to" field and a "subject" field. The addressee and copy-to fields will often each be capable of holding more than one identifier, so that a message can be sent to several addressees and copied to several more. (The "addressee" and "copy-to" fields are normally functionally equivalent as far as the system is concerned, with the distinction between the two being of significance only to the users.)

In a typical prior art system, when a user generates a message, the system will automatically transmit it to the addressees (including the copy-to's). At each of the stations to which it is sent, it will be stored in a folder (which may well be termed the "in-tray" folder). When the users at that station choose to manually inspect the contents of the in-tray, they will extract the various messages from it one after another, inspect each, and take whatever action they think appropriate, such as deleting the message, printing it out, or storing it in some other folder.

In practice, it is found that such a procedure can become burdensome, because the number of messages which accumulates in the in-tray can become so large that a considerable amount of time and effort is required for the user to work through the accumulation of messages in the in-tray, to manually sort the messages.

This invention provides a method and system which perform an automatic sorting and prioritizing of the messages in the in-tray, so that, for example, the user can deal with those messages of the highest priority first, selectively in their entirety, regardless of the chronological order in which the messages arrived at the user's location.

The object of the present invention is to provide such an improved automatic message sorting and processing system, driven by user created and modified rules, specifically for electronic mail.

SUMMARY OF THE INVENTION

The present invention provides a variety of features, which may be used separately or in combination. Among these features are: prioritizing electronic messages which have not yet been processed by the user; proposing forward-to addressees; proposing folders of the user into which the message may be copied; permitting forwarding and copying automatically if desired; dealing with all messages, whatever their type (e.g. phone messages, meeting announcements, reports); and processing all those and only those messages addressed to the user. It permits a highly flexible set of criteria to be defined for processing messages, in dependence on the identity of the sender, the identities and numbers of the addressees (direct and/or copy-tos), and the content of the message (subject and/or message-body fields).

The invention in its broad form resides in method and mail system of the type wherein a plurality of electronic mail messages are directed to a user at a terminal, and wherein the plurality of incoming mail messages is held in store in a main folder till accessed by the user for reading and action, the invention including a message control system to non-manually and automatically prioritize the plurality of messages selectively at any predetermined time of day, based on and using user created and stored files so that messages of relatively higher priority are sooner presented to the user or dealt with appropriately as desired, as priority messages, regardless of any chronological order in which messages were received for the user; said message control system comprises: a message store unit for storing incoming messages before prioritization; a rules control unit means operable by the user to create and modify rules for prioritizing received electronic mail messages; a rules storing means to hold in storage any user created and modified rules; a rules test unit which applies user created and modified rules to screen each message from the messages, and assigns a priority code selected from a range predetermined by the user to a screened message; and a message switch means responsive to an assigned priority code for selectively routing said screened message to a message main folder and forwarding to any other desired location, whereby a plurality of incoming electronic mail messages is sorted and screened using user created and modified rules for presenting to the user more important ones of the messages as priority mail for appropriate action.

BRIEF DESCRIPTION OF THE DRAWING

A message sorting and processing apparatus embodying these and other features of a preferred embodiment of the invention will now be described, by way of example, with reference to the drawings, in which.

DESCRIPTION OF PREFERRED EMBODIMENT

Figure 1:
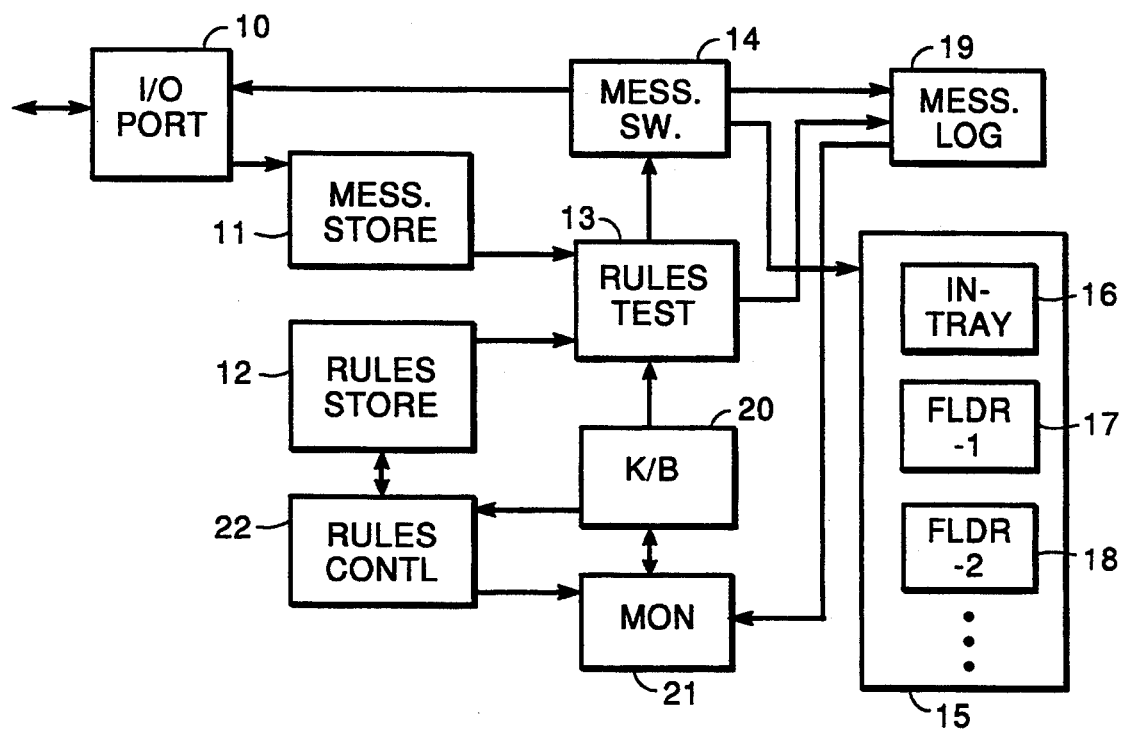
FIG. 1 is a general block diagram of a preferred embodiment of the system.

FIG. 1 shows in simplified form those parts of a work station which typify an embodiment of the the present invention. It will be understood that the work station will include other parts, not shown, providing general data-processing facilities. Also, some or all of the functions of the work station may in fact be implemented by means of a host computer shared by a number of users and which presents to each user the facilities of an independent work station under the sole control of that user.

Referring to FIG. 1, there is an I/O port 10 by means of which messages can be transmitted to and received from other work stations, via a message transmission network (which may include or consists of a host computer). Incoming messages pass through the I/O port to a message store 11, which holds them in readiness for processing by the rest of the apparatus. As will be explained later, the apparatus operates in accordance with a set of user created rules, and these are stored in a rules-store 12. The messages are matched against the rules stored in a rules test unit 13 which controls a message switch 14. The messages stored in store 11 are passed through the message switch back to the I/O port 10 for selective transmission to other work stations, and on to a main folder store 15; the folders include an in-tray folder 16 and other folders Folder-1 17, Folder-2 18, etc.

Information about the messages is also stored in a message log unit 19. A keyboard 20 enables the user to control the operation of the apparatus, and is coupled to a monitor 21 on which various operations, and the contents of the message log unit 19, can be displayed. A rules-control unit 22 is coupled to the keyboard 20 and the rules store 12. The unit enables the user to generate new rules and modify existing rules; existing rules are extracted from the rules store 12 for this purpose, and new or modified rules are returned to that store.

OPERATING MODES

The apparatus may be operated in either continuous or batch mode. In continuous mode, each message is processed as it is received. This involves applying all the rules in turn to an incoming message, and taking the appropriate actions. In the batch mode, incoming messages are accumulated in the message store 11, and processed at selected times; the processing times may be pre-programmed into the system (e.g. at times 0845 and 1245, so that the processed messages are available for the user to deal with when the user comes in the morning and back from lunch) or when demanded by the user.

In the case where the apparatus operates on demand from the user, it initially presents the user with an indication of the number of messages in the message store 11. The user can then select whether the apparatus shall operate in foreground mode, so that nothing else can be done until the message processing has been completed, or in background mode, so that the user can proceed with some other task, with the apparatus performing the message processing in the intervals in which that other task is not utilizing the resources of the work station.

The modes of operation described above can both be implicitly automatic. The apparatus can also be operated in a manual mode. For this, the apparatus presents the user with the proposed actions for each message, but awaits confirmation from them before performing these actions. For this, the apparatus preferably presents the proposed actions on the screen 21, to that the user can select the proposed actions one after another, e.g. by means of a cursor, for performance or not. It may be desirable for the screen to be split or windowed, so that the message can also be seen; the message is preferably scrollable on its part of the screen for this.

Advantageously, the user may set the apparatus to process the messages automatically for the current batch (i.e. the current contents of the message store 11), but to revert to the manual mode thereafter.

If the user decides temporarily to bypass the use of the present apparatus, then the messages in the message store 11 are simply transferred directly to the in-tray folder 16. The user can then obtain an indexed listing of them, read them, and otherwise process them in conventional manner.

There is a further mode, intermediate between the two modes described above, in which the apparatus operates, but the only action taken is to assign priorities to the messages as they are passed from the message store 11 to the in-tray folder 16.

Means are also preferably provided whereby the user can pass a selected message from the in-tray to the rules test unit 13. This enables the user to determine what actions the rules recommend on a message which has reached the in-tray without those actions having already been performed.

To forward a message to another user, it is convenient to utilize a technique in which, from a formal point of view, a new message is constructed. This involves generating appropriate fields for the new message, the new addressee-field indicating the user to whom the message is to be forwarded and the new sender-field indicating the user from whom it is being forwarded. The contents of the new subject-field may depend on the mode of operation; if the mode is automatic, then the contents of the new subject-field may be copied from the subject-field of the original message; if the mode involves monitoring or participation by the user, then the system may offer the user the option of either inserting a new subject or having the contents of the old subject field copied. The body of the new message is constructed by concatenating all the fields of the old message. This forwarding technique is known per se, and is accordingly not dwelt upon at greater length herein.

Statistical information relating to the operation of the apparatus, e.g. the total number of messages and the number of messages forwarded, is accumulated in the message log unit 19. This information can be extracted by the users if they wish to monitor and review the operation of the apparatus.

When message processing has been completed, by whatever variation of mode, the processed messages will be in the in-tray folder 16, in prioritized order for the user to attend to. Of course, the users can choose to transfer the messages directly to the in-tray, without processing, if they so desire.

ORGANIZATION—DETAIL

Figure 2:
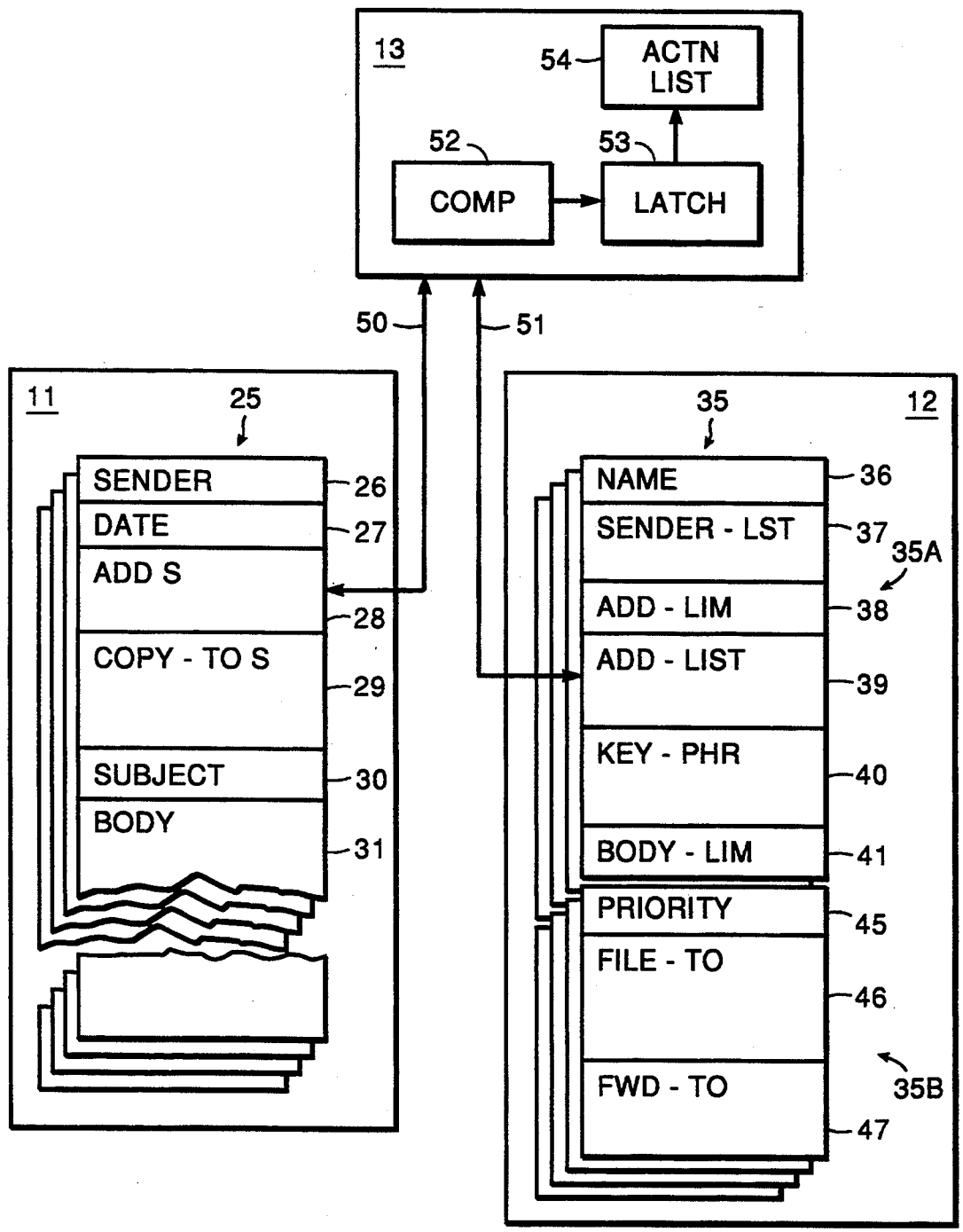
FIG. 2 is a more detailed block diagram of the message and rules stores of the system of FIG. 1.

FIG. 2 shows the organization of the message store 11, the rules store 12, and the rules test unit 13. The message store 11 contains a plurality of message storage units 25. Each new incoming message is stored in the next free unit 25, and when the apparatus runs to evaluate messages, each message in turn is evaluated and removed from its storage unit, leaving that unit free. Two pointers are used in a conventional manner to keep track of which units are occupied by messages. Similarly, the rules store 12 contains a plurality of rules storage units 35.

Considering now the structure of a message storage unit 25, this is organized advantageously to match the structure of the messages. Accordingly, it preferably consists of several sub-units or fields, corresponding to the fields of the messages. Preferably and specifically, it has the following fields:

- a sender field 26 which contains the identity of the sender. This identity is a unique binary identifier used by the system. Depending on the specific design of the system, the identifier may be chosen in a form which also has a mnemonic significance, or the system may include conversion tables which convert the identifier to a human-recognizable name.
- a date field 27. This is optional and may not be utilized in the present apparatus.
- an addressee field 28. This contains the identities of the addressees to whom the message is being sent, in the form of identifiers like the sender identifier. There can be more than one addressee.
- a copy-to field 29. This contains the identities of the addressees to whom the message is being copied. As noted above, the distinction between addressees and copy-tos is mainly of relevance to the users of the system, and not so much to the system itself. A copy-to addressee is usually sent a message merely for information, without any requirement that they should take any particular action.
- a subject field 30. This will contain a short heading identifying, to the addressees, the subject matter of the message.
- a body field 31. This will contain the main text of the message, and will be of highly varied length.

In practice, the storage units 25 and the fields in each will usually be implemented by assigning suitable regions in a general-purpose memory unit. This reduces the cost of the apparatus and allows memory space to be utilized effectively. Techniques for achieving this are well established in the art and are not elaborated herein.

The apparatus contains a number of rules in the rules store 12. Each rule consists of two parts, a "tests" or "conditions" part 35A and an "actions" part 35B. The apparatus operates by testing a message against each rule in turn. If the message matches the conditions part of the rule, then the apparatus takes the actions prescribed by the actions part of the same rule.

Considering now the structure of the conditions part of a rule, this matches the structure of the messages, but with significant differences. This conditions-part of the structure can be explained most easily by explaining the functions which it performs or satisfies.

Broadly, the user can set up a number of rules. Each rule tests whether the messages satisfy certain conditions concerning who the sender is, who the addressees and/or copy-tos are and their numbers, and the nature of the subject and a definable initial part of the message body field. If a rule is satisfied, then the actions which result can be assigning a priority level to the message, filing it in one or more selected files, and forwarding it to further addressees.

Considering now the structure of a rule storage unit 35, the tests part 35A is organized to match the structure of the messages, but with significant differences. The sub-units or fields of the tests part 35A are as follows:

- a rule name field 36. This contains a name chosen by the users when the rule is being constructed, to aid them in recognizing the nature of the rule if they want to review or amend it later.
- a sender field 37 which contains the identities of equivalent senders. A user may want to treat messages from different senders (e.g. either of two joint chairmen of a committee) in the same way.
- an addressee number limits field 38. (This has no direct counterpart in the message structure.) This contains three parts, each of which can be set to define lower and upper bounds on the number of addressees; the three parts are for direct addressees, copy-tos, and total addressees (direct plus copy-tos). A user may wish to treat a message directed to a large number of addressees as of low importance, or more generally to treat a message differently depending on the number of direct and/or copy-to addressees.
- an addressees field 39. This contains a list of equivalent addressees. A user may wish to treat a message in different ways depending on who else it is addressed to and/or copied to. Since the user may wish to treat direct addressees and copy-tos differently, each addressee in the list is tagged to indicate whether it is to be matched against direct addressees, copy-tos, or both.
- a keyphrase field 40. This contains a list of keyphrases which are robe matched against the contents of the message, Each keyphrase is tagged to indicate whether it is to be matched against subject field, message body fields or both. The nature of the keyphrases and their matching is discussed in more detail later.
- a keyphrase zone limit field 41. This sets how much of the message body is used for the keyphrase matching. Users may want to look for a keyphrase anywhere in the entire message body, or they may prefer to limit the search for a keyphrase to the initial part of the message body.

The sub-units or fields of action part 35B of the rule storage unit 35 are as follows:

- a priority field 45. If the message matches the rule conditions, then it is given the priority level set by this field, which can have a value of say between 1 (highest priority) and 5 (lower priority).

a file-to field 46. This contains a list of folders in the user's main folder store 15. If the message matches the rule conditions, then it is filed in the appropriate folders.

a forward-to field 47. This contains a list of addressees; if the message matches the rule conditions, then it is forwarded to these addressees.

The work station may have a distribution list facility, by means of which the user can, when generating a message, enter the distribution list as a direct and/or copy-to addressee. If this facility exists, the apparatus may allow distribution lists to be used in the sender and addressees fields; such a distribution list will be treated as an indirect addressing of its list of addressees.

The rules storage units 25 in the rules store 12 are preferably subdivided into sets so that a plurality of different sets of rules can be stored, any one of which can be selected by the user. This will allow two different users to share the same work station, or a single user to use different rule sets at different times.

In practice, the storage units 25 and 35 and the fields in each will usually be implemented by assigning suitable regions in a general-purpose memory unit. This reduces the cost of the apparatus and allows memory space to be utilized effectively. This can be achieved by conventional techniques, which accordingly are not dealt with in greater detail herein.

OPERATION—DETAILS

The message storage units 25 and the rules storage units 35 are coupled to the rules test unit 13 by coupling means, illustrated diagrammatically as 50 and 51, which select the various fields in succession. Corresponding fields are fed to a comparator unit 52 which makes comparisons of successive pairs of fields, and which is coupled to a latch unit 53 which stores the results (both intermediate and final) of the comparisons.

More specifically, comparator 52 first matches the sender field 26 with the addresses in the sender-list field 37. If there is no match, at this or any later stage, then the comparison with that rule is immediately terminated, and the next rule is selected. (Obviously the order of the various tests can be chosen for maximum efficiency; thus it may be preferable to perform this test after the next-described test.) The order in which the tests are performed can even be made dependent on the contents of the fields, so that the order in which the sender and addressee fields are tested depends on how many comparisons have to be made for each.

If there is a match, then the comparator next counts the numbers of addresses in the addressees and copy-tos fields 28 and 29 and matches these with the limits set in the addressee limits field 38. The addresses in the fields 28 and 29 are then matched against those in the addressees list field 39.

If the matching so far has been successful, then the subject and body fields 30 and 31 are matched against the keyphrases field 40, under the control of the keyphrase zone-limit field 41. The keyphrases field may contain a number of keyphrases, each of which is made up of keywords which are treated as character strings for matching purposes. The keywords may be combined in logical combinations in the keyphrases. The comparator 52 first matches the individual keywords, and then evaluates the logical combinations to determine whether the keyphrase is satisfied.

Some of the fields in a rule may be left empty; such fields are in general treated as automatic matches. For example, if the sender-list field 37 is left empty, that field will be treated as matching all senders. Thus a rule can operate only on senders, only on keyphrase, or on both in combination.

If a rule is successfully matched, then the latches 53 in rules test unit 13 are set to perform the actions stored in the actions part 35B of the rule storage unit 35, and the actions are copied into an actions storage unit 54 in the rules test unit 13. When the message has been matched against all rules of the rule set, the actions stored in the actions storage unit 54 are matched against each other, to eliminate duplications of file-tos and forward-tos and to select the highest of whatever priorities have been assigned to the message. The actions are then carried out; the message is filed in the in-tray with the appropriate priority appended to it and in any further appropriate folders and forwarded to the appropriate addressees (if any). The next message, if any, is then selected for processing.

If two or more rules match a message and their actions are different, this may be regarded as indicating an inconsistency between the rules. It would be possible for the rules control unit 22 to test the rules against each other to detect such potential inconsistencies and require the user to correct one or more of the rules to eliminate such inconsistencies. However, such inconsistencies will often be harmless, and it may be preferable to accept some—e.g. forwarding of a message which happens to match the keyphrases fields of two different rules to two different sets of forward-tos. The message log unit 19 may be arranged to record such inconsistencies, so that the user can review them later and decide whether any of them calls for amendment of the rules.

RULES CONSTRUCTION

The rules store 12 is coupled to the rules control unit 22, which is in turn coupled to the keyboard 20 and the monitor 21, as above. The operator can copy the rules from the rule store 12 to the rules control unit 22 for inspection and possible amendment, and return them (or newly created rules) to the rules store 12. A rule can also effectively be copied, to serve as a template for the creation of a new but similar rule, by selecting a rule from the rule store and changing its name.

The monitor 21 displays a rule so selected with its fields suitably laid out and labelled, in a manner broadly matching the layout shown in FIG. 2 for the rule storage unit 35. Thus the sender-list field, for example, can conveniently be shown near the top of the screen, with a label such as "Sender List", and with the possible senders to which the rule applies shown in successive lines below the label. The display is preferably scrollable.

The rules control unit 22 incorporates consistency checking means, which check for inconsistencies and require the user to correct them before the rule can be stored in the rules store 12. Such inconsistencies include such matters as duplicated addressees, an upper limit on the number of addressees which is smaller than the lower limit, and inconsistencies between the limits for direct addressees, indirect addressees, and total addressees.

The keyphrase field is preferably laid out as a number of lines which are effectively ORed; that is, the keyphrase match is satisfied if the conditions of any line are satisfied. On a given line, the keywords are preferably combined into a keyphrase by means of a + symbol for and a − symbol for OR NOT. These conventions enable users to make effective use of the permitted logical combinations without requiring them to be instructed in conventional Boolean logical terminology and representation.

The keyword matching is preferably implemented with a disregard for case (so that "SYSTEM", "System", and "system" will not be differentiated); and with the implicit condition that the required keyword is not followed by a letter character (so that "AI" does not match "main", but "system" matches "system " (with a final space) and "system." (with a final period or full stop), and also matches "subsystem"). Obviously, variations and elaborations of these conventions are possible. (The term "keyword" is not confined to a single word, but can include character combinations such as "A. I.")

The apparatus can be modified to allow one of the actions of a rule to be the total deletion of a message. This can be achieved by including an additional field in the actions part of the rule, or implicitly by treating the lowest priority level as a delete function. Deletion can of course be combined with forwarding of the message to someone else.

Another possible modification involves using arithmetical weighting to calculate the priority value of a message. For this, the subject matter of the subject field and/or text of the message (as determined by the keywords), the sender, the direct and copy-to addressees and their numbers are all given suitable weightings, and the sum of the weightings is quantized to give the priority value.

While the description hereinabove refers to preferred embodiments of the invention, it is envisaged that various modifications of the preferred embodiments of the structure and operating method of the message control system of the invention are conceivable; it is intended that all such modifications are covered by the scope of the present invention which is as defined in the appended claims.

What is claimed is:

1. A system for prioritizing by an individual user a plurality of messages directed to and received by a preidentified user of an electronic mail system comprising a message store for storing received messages directed to the user; rules control means operable by the individual user for creating a plurality of individualized user-defined rules for prioritizing received messages in accordance with criteria selected by the individual user; means for storing said user-defined rules; rules testing and priority assigning means for automatically applying said user-defined rules to each message in the message store thereby assigning to each message a priority within a predetermined range of priorities selected by the user; and means responsive to assigned message priorities for selectively routing each message to a main message folder for later presentation to the user in order of said assigned priority.

2. The system of claim 1, wherein each message comprises a plurality of fields, each field containing information of a predetermined type, and wherein the rules testing means includes means for comparing information in one or more of such message fields with criteria embodied in said user-defined rules thereby assigning a priority to a message.

3. The system of claim 2, wherein said message store comprises a plurality of message storage units, one associated with each message, the message storage units each having a plurality of regions corresponding to the plurality of fields in each message for storing in such regions information contained in the corresponding fields of each associated message, and wherein said rules testing means compares information stored in predetermined ones of such regions with selected criteria embodied in said user-defined rules.

4. The system of claim 3, wherein each of said user-defined rules comprises a first part which includes conditions specified by said criteria which are applied to each message and a second part which specifies actions to be taken upon a message matching the conditions in the first part.

5. The system of claim 4, wherein the conditions include the identity of a message sender, the number an identity of addressees of a message, and keyphrases which may be contained in an address or text within a message.

6. The system of claim 4, wherein each second part specifies rules testing means for assigning a priority code to a message in response to the results of the comparing of the information in message fields with conditions in the first part of the rule, and means for directing a message to other users and to files which may be used by other users.

7. The system of claim 2, wherein the rules testing means includes means for applying user defined rules to stored messages in a preselected sequence, means for storing the results of a partial application of said sequence, and means automatically for varying the sequence in which the remaining user-determined rules are applied to each message in response to said partial results.

8. The system of claim 1, wherein the means for selectively routing messages to the main message folder comprises means for arranging messages within the folder in order of priority such that messages having the highest priority are presented to the preidentified user first.

9. The system of claim 1, wherein the rules control means includes means operable by a user for modifying previously created user-defined rules stored in said rules storing means.

10. A method of prioritizing a plurality of messages directed to a user of an electronic mail system comprising the steps of storing messages directed to the user in a message store; prioritizing the stored messages in accordance with criteria selected individually by the user by automatically applying to each of the stored messages a plurality of individualized user-defined rules thereby, assigning to each stored message a priority; and selectively routing each of the stored messages to a message folder of the user for later presentation to the user in order of assigned priority.

11. The method of claim 10, wherein each message comprises a plurality of fields which contain information of predetermined types, and wherein said applying comprises comparing information in one or more of such message fields with criteria embodied in said user defined rules, thereby assigning a priority.

12. The method of claim 11, wherein said storing comprises storing information contained in message fields in regions of the message store corresponding to such fields.

13. The method of claim 12, further comprising the step of acting upon each of the stored messages in predetermined ways depending upon the results of such comparing.

14. The method of claim 13, wherein said predetermined user has a plurality of folders in said electronic mail system, and wherein said acting comprises forwarding each message to other users and to selected ones of said plurality of folders of the preidentified user.

15. The method of claim 13, wherein the information in the message fields which is compared to the criteria embodied in said user defined rules include the identity of a message sender, the number and identities of addresses of a message, and keyphrases contained within a sent message.

16. The method of claim 15, wherein said applying is done sequentially, partial results are stored and any remaining results may be automatically controlled in response to said partial results.

* * * * *